United States Patent Office 3,285,898
Patented Nov. 15, 1966

3,285,898
PROCESS FOR THE POLYMERIZATION AND CO-POLYMERIZATION OF HALOGENATED MONO- AND DI-OLEFINS
James C. MacKenzie, Wellesley Hills, and Adam Orzechowski, Waltham, Mass., assignors to Cabot Corporation, Boston, Mass., a corporation of Delaware
No Drawing. Filed Oct. 1, 1962, Ser. No. 227,545
The portion of the term of the patent subsequent to Jan. 18, 1982, has been disclaimed
20 Claims. (Cl. 260—92.3)

This invention relates to the polymerization and copolymerization of halogenated, conjugated and unconjugated, α-mono- and diolefins such as tetrafluoroethylene, vinyl chloride, chlorotrifluoroethylene, 2-bromopropylene, 3-bromo-1,4-hexadiene and 2-chloro-1,3-butadiene.

Accordingly, it is a principal object of the present invention to provide a novel process for polymerizing halogen-substituted α-mono- and diolefins and mixtures thereof.

Other objects will in part be obvious and will in part appear hereinafter. In accordance with the present invention halogenated α-mono- and diolefins are polymerized and/or copolymerized by catalysts comprising (a) the product of the reaction carried out under certain conditions between a halide-type compound of a metal of Group IVa, Va, VIa, VIIa or period 4 of Group VIII and hydroxyl groups on surface of a finely divided particulate inorganic solid, and (b) an organometallic compound. The polymerization or copolymerization reaction can be effected at suitable temperatures within the range of from about −80 degrees to about 250 degrees centigrade, and pressures ranging from below atmospheric upwardly to any desired maximum pressure.

Inorganic solids suitable for the purposes of the present invention generally include any inorganic compound which is available in finely divided particulate form with hydroxyl groups on the surface thereof. For example, oxides such as alumina, zirconia and silica, carbon blacks such as channel black and furnace black, and aluminates such as corundum are generally suitable for the purposes of the present invention. In particular, inorganic solids having an average particle diameter of less than about 0.1 micron and having at least about $1 \times 10^{-4}$ equivalents per gram of hydroxyl groups chemically bound to the surface thereof, as set forth in more detail in U.S. application Serial No. 2,861, filed January 18, 1960, now abandoned, are preferred in accordance with the present invention.

Halide-type compounds of Group IVa, Va, VIa, VIIa or period 4 of Group VIII metals (hereinafter generally referred to as transition metal halides) suitable for the purposes of the present invention are the compounds conforming to the empirical formula:

$$TO_aX_b$$

wherein T is a metal of Groups IVa, Va, VIa, VIIa or period 4 of Group VIII (where the group numbers correspond to the Mendeleev Periodic System); O is oxygen; $a$ equal 0, 1 or 2; each X is any halogen; and $b$ is an integer from 1 to 7.

Examples of suitable compounds conforming to said empirical formula are halides such as zirconium tetrachloride, vanadium tetrachloride, ferric chloride, manganese dichloride and titanium tetraiodide, and oxyhalides such as chromium oxychloride and vanadium oxychloride.

The conditions under which reaction between the transition metal halide and the finely divided, inorganic solid can be accomplished are subject to considerable variation. However, in order to obtain a catalyst component with exceptionally high activity and reproducible character and performance, it has been found to be all important that the finely divided, inorganic solid be essentially dry and anhydrous (i.e., free of molecular water in any form) at the time it is brought into contact with the transition metal halide. In addition, it is recommended that the reaction of the inorganic solid and the transition metal halide be accomplished so as to allow by-products of the reaction to be eliminated from the reaction zone in order to thereby insure that said reaction goes to completion. Generally, the said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture. Generally speaking, almost any temperature between 0° C. and 300° C. and even higher temperatures can be used satisfactorily, but room temperature to about 105° C. is generally definitely preferred. Assuming provision is made for intimate contact of the dry inorganic solid and the transition metal halide, the *minimum* time required to accomplish the chemical reaction will vary from about 1 hour at room temperature to about 15 minutes at temperatures of 100° C. or over. Temperatures substantially higher than about 300° C., e.g., 500° C. are completely needless and therefore of little or no interest.

Elimination of by-products of the reaction from the reaction zone, i.e., from the reaction medium, can be accomplished in any convenient manner such as, by sweeping the reaction vessel with an inert gas, by carrying out the reaction at sufficiently elevated temperatures while stirring to drive by-products out of the reaction medium, or by complexing or reacting said by-products with suitable substances such as tertiary amines, tertiary arsines, tertiary phosphines, terpenes, terpinenes, tetrasubstituted hydrazines, carbides such as calcium carbide, and other substances which will react or complex with said by-products and thereby eliminate them.

Organometallic compounds suitable for the purposes of the present invention are the compounds chosen from the group consisting of (a) compounds conforming to the empirical formula $$MM'_vX_nR_y$$

wherein M is a metal chosen from Groups I, II and III of the periodic table; M' is a metal of Group I of the periodic table; $v$ equals 0 or 1; each X is any halogen; $n$ equals 0, 1, 2 or 3; each R is any monovalent hydrocarbon radical or hydrogen; and $y$ equals 1, 2, 3 or 4; and (b) compounds conforming to the empirical formula $$R'_pH_mSiO_{\frac{4-(m+p)}{2}}$$

wherein each R' is chosen from the group consisting of monovalent hydrocarbon radicals, monovalent alkoxy radicals, monovalent aryloxy radicals, and the halogens; $p$ is 0, 1, 2 or 3; each H is a hydride radical; $m$ is 1, 2, 3 or 4; Si is silicon; and O is oxygen.

Specific examples of R' groups for substitution in the above formula include methyl, 2-methyl-2-butenyl, n-dodecyl, 4-cyclohexylethyl, methylnapthylethyl, 2,2,1-bi-cycloheptyl, tolyl, xylyl, xenyl, methoxy, isobutoxy, n-octyloxy, phenoxy and 1,2-naphthoxy.

Specific examples of compounds conforming to the formula $$R'_pH_mSiO_{\frac{4-(m+p)}{2}}$$

which are suitable for the purposes of the present invention are silane, SiH₄; ethylsilane, H₃SiC₂H₅; diethylmonochlorosilane, HSiCl(C₂H₅)₂; dichlorosilane, H₂SiCl₂; methyldiethylsilane, HSi(C₂H₅)₂CH₃; dicyclohexylphenylsilane, HSiC₆H₅(C₆H₁₁)₂; triphenoxysilane, $$HSi(OC_6H_5)_3$$

and linear alkyl hydrogen silicones such as $$(CH_3)_2HSiOSiH(CH_3)_2$$

Organometallic compounds which conform to the formula $$MM'_vX_nR_y$$

and which are suitable for the practice of the invention include compounds conforming to the subgeneric formula:

$$MR_k$$

wherein M is a Group I, II or III metal, such as sodium, beryllium, boron, aluminum and gallium; wherein $k$ equals 1, 2 or 3 depending upon the valency of M; and wherein each R may be hydrogen or any monovalent hydrocarbon radical. Examples of suitable hydrocarbon radicals include aryl or alkaryl radicals, aliphatic hydrocarbon radicals, or derivatives, such as alkyl, cycloalkenylalkyl, arylalkyl, alkylcycloalkyl and cycloalkylalkenyl.

Specific examples of R groups for substitution in the above formula include methyl, isobutyl, hexyl, n-dodecyl, 2-methyl-2-butenyl, 4-cyclohexylethyl, 2-phenylpropyl, methylnaphthylethyl, 2,2,1-bicycloheptyl, dimethylcyclohexyl, 5-cyclopentadienyl, phenylcyclohexyl, tolyl, xylyl, xenyl, and dimethylnaphthyl.

Specific compounds conforming to the empirical formula, $MM'_vX_nR_{y-n}$, and which are therefore suitable for the purposes of the present invention are organo compounds such as butyllithium, divinylmagnesium, di-p-tolylmercury, tri-n-amylboron, triisobutylaluminum, diisobutylaluminum bromide, phenylmercuric iodide, hexylcupric chloride, octylmagnesium hydride, triethyllithium aluminum bromide and sodium diphenyllithium. Definitely preferred, however, are the aluminum alkyls such as aluminum triisobutyl.

Further specific examples of suitable organometallic compounds conforming to the formula $$MM'_vX_nR_y$$

can be found in our copending U.S. application, Serial No. 2,861, filed January 18, 1960, now abandoned.

It is pointed out that catalysts formed with a silane require activation by heating to a temperature above about 100° C. and preferably above about 140° C. for at least about 1 hour. At higher temperatures, shorter periods of time are required. At substantially lower temperatures, the catalyst is either not formed at all or is of inferior quality.

Although it is appreciated that when R or R′ in the above empirical formulae do not comprise at least one hydrocarbon radical, the resulting compounds cannot normally be termed organometallic compounds, compounds lacking at least one hydrocarbon radical comprise such a relatively small number of compounds included by said formulae that for the purposes of the present invention, it is intended that these compounds be included within the generic term, organometallic compound. Accordingly, in the specification and in the claims, it is intended, and therefore it should be understood, that the term organometallic compound, refers to all the compounds included within the scope of the above defined empirical formulae. In addition, it is pointed out that while, strictly speaking, silicon is not a metal, it is clearly intended, and therefore it should be understood, that for the purposes of the present specification and claims, silicon is a metal and the term, "organometallic," includes within its scope all those compounds within the scope of the formula $$R'_pH_mSiO_{\frac{4-(m+p)}{2}}$$

Halogenated α-mono- and diolefins suitable for the purposes of the present invention are those conforming to the formula:

$$CH_eX_d=C'H_cX_f$$

wherein C is carbon; each H is a hydrogen; $c$ equals 0, 1 or 2; each X is any halogen; $d$ equals 0, 1 or 2; $c+d=2$; C′ is any aliphatic, alicyclic, or aromatic carbon chain wherein said chain contains 1–18 carbon atoms; $e$ equals 0–36; $f$ equals 0–6; and wherein $f+d$ equals at least one.

Specific examples of halogenated α-mono- and diolefins within the scope of the present disclosure, in addition to those already mentioned, are 1,2-dichloro-1,2-difluoroethylene; 1,3-di-chloropropylene; 3,3-dibromo-1-fluoropropylene; 1,6-dichloro-1,5-hexadiene; 2-fluoro-1,3-butadiene; and vinyl 2,5-dichlorobenzene.

Using the catalysts of this invention, polymerization of the halogenated α-mono- and di-olefins can be accomplished in the absence of liquids (other than the monomers themselves) solvents or diluents, for example, in the gas phase, but it is usually more convenient to effect polymerization in the presence of a substantially inert liquid reaction medium. Accordingly, an inert reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable. Also members of the aromatic hydrocarbon series such as isopropyl benzene, ethyltoluene, hemimellitene, pseudocumene, isodurene, isoamylbenzene, and particularly the mononuclear aromatic hydrocarbons such as xylenes, mesitylene and xylene p-cymeme mixtures, and the like are completely suitable.

The proportion of surface reacted particulate inorganic solid to organometallic compound utilized in preparing the catalyst is not usually a critical feature of the process. We have found from experience that a molar ratio of from 0.1 to 5 millimols of the organometallic compound per atom of transition metal chemically combined with the surface of the finely divided solid is to be preferred.

The quantity of catalyst, i.e., comprising both the surface reacted finely divided solid and the organometallic compound, to be utilized in the polymerization reaction may vary, but in general, the total quantity of catalyst that need be employed based on the weight of the charging stock is very small particularly when a very fine particle size oxide is utilized as the inorganic solid.

The contact time or space velocity employed in the polymerization process will be selected with reference to the other process variables such as the particular catalysts utilized, the specific type of product desired, and the extent of monomer conversion desired in any given run or pass over the catalyst. In general, this variable is readily adjustable to obtain the desired results.

There follow a number of illustrative non-limiting examples:

*Example 1*

To a 2000-ml., three-neck, glass reaction vessel there is added 25 grams of "Cab-O-Sil," a pyrogenic silica produced by Cabot Corporation, which has an average particle diameter of about 10 millimicrons and a hydroxyl group content on the surface thereof of about 1.5 milliequivalents per gram. Said reaction vessel is then dried in a vacuum oven for 24 hours at a temperature of about 120° C. Subsequently, the vessel is sealed without exposing the silicia to the atmosphere and there is charged to said vessel 25 millimoles of titanium tetrafluoride and 1000 milliliters of anhydrous hexane. The vessel is then continuously stirred and maintained at a refluxing temperature for a period of 24 hours while the contents thereof are swept by a stream of dry nitrogen. Subsequently, the extent of the reaction between titanium tetrafluoride and the silica is determined by measuring the quantity of HF removed from the vessel by the nitrogen stream, and by testing the liquid contents of the vessel for the absence therein of titanium tetrafluoride. The said silica is found to have 25 milliatoms of titanium chemically bound to the surface thereof. 80 milliliters of this slurry containing about 2 milliatoms of titanium bound to the surface of about 2 grams of silica, is then transferred from this reaction vessel to an 8 oz. bottle which has been flushed with dry nitrogen. Next, without exposure to the atmosphere, 2 millimoles of diisobutylaluminum chloride followed by 200 millimoles of purified 20 chloro-1,3-butadiene (chloroprene) are charged into the bottle. The bottle is then continuously agitated at ambient temperatures for about 48 hours. The reaction products are analyzed and it is found that about 1.5 grams of solid 2-chloro-1,3-butadiene (neoprene) polymer has been produced.

*Example 2*

To a 500-milliliter reactor bomb there is added about 80 milliliters of the catalyst slurry produced in Example 1 which contains about 2 milliatoms of titanium chemically bound to the surface of about 2 grams of silica. Next, 2 millimoles of triisobutylaluminum are added to the bomb, followed by pressurization with 200 millimoles of chlorotrifluoroethylene gas. The reaction vessel is then heated to, and maintained at, 80° C. with continuous agitation for 24 hours. The reaction products are analyzed and it is found that solid chlorotrifluoroethylene polymer has been produced. When, under the same conditions, the triisobutylaluminum or the silica bearing chemically combined titanium on the surface thereof is utilized alone as the catalyst, no solid polymer is produced.

*Example 3*

To a 2000-milliliter, three-neck, glass reaction vessel equipped with a stirrer, a condenser and nitrogen inlet and outlet tubes, there is added 15 grams of "Hi-Sil-X-303," a precipitated silica produced by Columbia Southern Chemical Corp., and which has an average particle diameter of about 23 millimicrons and a hydroxyl group content on the surface thereof of about 1.3 milliequivalents per gram. To said reaction vessel there is added 1700 milliliters of toluene and the resulting slurry is dried by being heated to, and maintained at, the boiling point of toluene, about 111° C. for about 24 hours while a water/toluene azeotrope is removed from the reaction vessel by periodic distillation until 450 milliliters of distillate has been removed. The vessel is then cooled and charged with 12 millimoles of chromium oxychloride. The resulting slurry is then heated to, and maintained at, about 100° C. for 8 hours with continuous stirring while the contents are swept with a stream of dry nitrogen. Subsequently, the extent of the reaction between the chromium oxychloride and the hydroxyl groups on the silica is determined by measuring the quantity of HCl that was produced and by testing the liquid contents of the vessel for the absence therein of chromium oxychloride, and the said silica is found to have 12 millimoles of chromium chemically bound to the surface thereof. A sample of 50 milliliters of this slurry containing about 0.5 millimole of chromium chemically bound to the surface of about 0.6 gram of silica, is then transferred from this reaction vessel to a 100 cc. stainless steel bomb which has been previously flushed with dry nitrogen. Next, 2 millimoles of triphenoxysilane is introduced into the bomb and the bomb is then continuously agitated and heated to, and maintained at about 150° C. for about 1 hour. The bomb is then allowed to cool to 80° C. at which temperature the bomb is thereafter maintained. The bomb is then pressurized to, and maintained at 800 p.s.i. with tetrafluoroethylene for 1 hour. The reaction products are analyzed and it is found that solid tetrafluoroethylene polymer has been produced.

*Example 4*

To a 2000-milliliter, three-neck, glass reaction vessel there is added 21.2 grams of "Alon," a pyrogenic alumina produced by Deutsche Gold-und Silber-Scheideanstalt vormals Roessler, and which has an average particle diameter of about 10–40 millimicrons and a hydroxyl group content on the surface thereof of about 0.7 milliequivalent per gram. Said reaction vessel is then placed in a vacuum drying oven heated to a temperature of about 110° C. for about fifteen hours. Subsequently, the vessel is sealed without exposing said alumina to the atmosphere and there is charged to said vessel 14 millimoles of vanadium oxytrichloride in 1200 milliliters of anhydrous isooctane. The vessel is then continuously stirred, and maintained at refluxing temperatures (about 99.2° C.) for a period of about 8 hours while the contents thereof are swept with a stream of dry nitrogen. Subsequently, the extent of the reaction between hte vanadium oxytrichloride and the alumina is determined by measuring the quantity of HCl removed from the vessel by the nitrogen stream, and by testing the liquid contents of the vessel for the absence therein of vanadium oxytrichloride, and the said alumina is found to have 14 milliatoms of vanadium chemically combined to the surface thereof. 171 milliliters of this slurry containing about 2 milliatoms of vanadium bound to the surface of about 3.0 grams of alumina, is then transferred from this reaction vessel to a 1000 milliliter reaction vessel which has been previously flushed with dry nitrogen. Next, 3 millimoles of butyllithium is added to the said vessel followed by 400 millimoles of allyl bromide monomer. Said second vessel is then continuously agitated at ambient temperatures for about 48 hours. The reaction products are analyzed and it is found that solid allyl bromide polymer has been produced.

*Example 5*

To a 4000-milliliter, three-neck glass reaction vessel there is added 20 grams of "Cab-O-Sil" silica. Said reaction vessel is then placed in a vacuum drying oven heated to a temperature of about 100° C., for about 12 hours. Subsequently, the vessel is sealed without exposing said silicia to the atmosphere and there are charged to said vessel 20 millimoles of titanium tetrachloride and 2000 milliliters of anhydrous isooctane. The vessel is then continuously agitated and heated to, and maintained at about 99.2° C. for a period of 15 hours while the contents thereof are continuously swept with a stream of dry nitrogen. Subsequently, the extent of the reaction between the titanium tetrachloride and the silica is determined by measuring the quantity of HCl removed from the vessel by the nitrogen stream, and by testing the liquid contents of the vessel for the absence therein of titanium tetrachloride, and the said silica is found to have 20 millimoles of titanium chemically bound to the surface thereof. 2 grams of this silica containing about 2 millimoles of titanium chemically bound to the surface thereof, and suspended in about 200 milliliters of isooctane is then transferred without exposure to the atmosphere from this reaction vessel to a 500-milliliter, three-neck, glass reaction vessel which has been previously flushed with dry nitrogen. 100 milliliters of anhydrous isooctane, 100 millimoles allyl bromide, and 50 millimoles of 2-bromo-1,3-butadiene are then charged to this vessel without exposure to the atmosphere. Next, 2 millimoles of triethylaluminum is added, and the contents of said reaction vessel are continuously and vigorously stirred for about 24 hours. The reaction product is analyzed and it is found that a solid allyl bromide-2-bromo-1,3 - butadiene copolymer has been produced.

The polymers produced by the process of this invention can be subjected to such aftertreatment as may be desired to fit them for particular uses or to impart desired properties. Thus, the polymers can be extruded, mechanically milled, filmed or converted to sponges or lattices. Also, anti-oxidans, stabilizers, fillers such as carbon black and silicas, extenders, plasticizers, pigments, insecticides, fungicides, etc., can be incorporated into the polymers.

Obviously, many changes may be made in the above described examples and procedure without departing from the scope of the invention. For example, although only transition metal fluorides and chlorides are mentioned in the above examples, transition metal bromides and iodides such as vanadium pentabromide are also suitable for the purposes of the present invention.

Also, pyrogenically coformed, or coprecipitated metal oxides, or metal oxides coformed with, or mixed with, other compounds are suitable finely divided inorganic solids for the purposes of the present invention.

Accordingly, it is intended that the above disclosure be regarded as illustrative and as in no way limiting the scope of the invention.

What we claim is:

1. A process for homopolymerizing halogenated α-mono- and diolefins, and mixtures of halogenated α-mono- and diolefins, which comprises contacting at temperatures between about −80° C. and 250° C. a substance conforming to the formula $$CH_cX_d = C'H_eX_f$$

wherein C is carbon; each H is a hydrogen; $c$ equals 0, 1 or 2; each $X$ is any halogen; $d$ equals 0, 1 or 2; $c+d=2$; C' is any aliphatic, alicyclic, or aromatic carbon chain wherein said chain contains 1–18 carbon atoms; $e$ equals 0–36; $f$ equals 0–6; and wherein $f+d$ equals at least one, with a catalyst comprising
  (a) a finely-divided inorganic solid having an average particle diameter of less than about 0.1 micron and carrying in chemical combination on the surface thereof at least about $1 \times 10^{-4}$ equivalents per gram of structures conforming to the formula $$TO_aX_b$$

wherein T is a metal chosen from the group consisting of the metals of Groups IVa, Va, VIa, VIIa and period 4 of Group VIII (Mendeleev Periodic System); O is oxygen; $a$ is a number from 0 to 2; each X is any halogen; $b$ is a number from 1 to 5; and where said structures are chemically linked directly from T to at least one oxygen atom in the surface of said solid; and
  (b) an organometallic compound chosen from the group consisting of compounds conforming to the empirical formula (1) $\qquad MM'_vX_nR_y$ where M is chosen from the group consisting of the metals of Groups I, II and III; M' is a metal of Group I; $v$ is 0 or 1; each $X$ is any halogen; $n$ is 0, 1, 2 or 3; each R is chosen from the group consisting of any monovalent hydrocarbon radical and hydrogen; and $y$ is 1, 2, 3 or 4; and (2) $\qquad R'_pH_mSiO_{\frac{4-(m+p)}{2}}$ wherein each R' is chosen from the group consisting of hydrocarbon radicals, alkoxy radicals, aryloxy radicals and the halogens; $p$ is 0, 1, 2 or 3; each H is a hydride radical; $m$ is 1, 2, 3 or 4; Si is silicon; and O is oxygen.

2. The process of claim 1 wherein each X in the formula $$TO_aX_b$$

is chlorine.

3. The process of claim 1 wherein the substance conforming to the formula $$CH_cX_d = C'H_eX_f$$

is 2-chloro-1,3-butadiene.

4. The process of claim 1 wherein the substance conforming to the formula $$CH_cX_d = C'H_eX_f$$

is vinyl chloride.

5. The process of claim 1 wherein the substance conforming to the formula $$CH_cX_d = C'H_eX_f$$

is tetrafluoroethylene.

6. The process of claim 1 wherein said organometallic compound is an aluminum alkyl.

7. The process of claim 1 wherein said organometallic compound is a silane.

8. The process of claim 1 wherein said organometallic compound is a dialkylsilane.

9. The process of claim 1 wherein in said formula $$TO_aX_b$$

$a$ is 0.

10. The process of claim 1 wherein in said formula $$TO_aX_b$$

$a$ is 0 and each X is chlorine.

11. The process of claim 1 wherein in said formula $$TO_aX_b$$

T is a member of Group IVa.

12. The process of claim 1 wherein in said formula $$TO_aX_b$$

T is zirconium.

13. The process of claim 1 wherein in said formula $$TO_aX_b$$

T is titanium.

14. The process of claim 1 wherein in said formula $$TO_aX_b$$

T is titanium, $a$ is 0 and each X is chlorine.

15. The process of claim 1 wherein in said formula $$TO_aX_b$$

T is a member of Group Va.

16. The process of claim 1 wherein in said formula $$TO_aX_b$$

T is vanadium.

17. The process of claim 1 wherein in said formula $$TO_aX_b$$

T is a member of Group VIa.

18. The process of claim 1 wherein said organometallic compound conforms to the formula $$MM'_vX_nR_y$$

and wherein in said formula M is aluminum, $n$ is 0 and each R is a hydrocarbon radical.

19. A process for homopolymerizing halogenated α-mono- and diolefins, and mixtures of halogenated α-mono- and diolefins, which comprises contacting at temperatures between about −80° C. and about 250° C., a substance conforming to the formula $$CH_cX_d = C'H_eX_y$$

wherein C is carbon; each H is a hydrogen; $c$ equals 0, 1 or 2; each X is any halogen; $d$ equals 0, 1 or 2; $c+d=2$; C' is any aliphatic, alicyclic, or aromatic carbon chain wherein said chain contains 1–18 carbon atoms; $e$ equals 0–36; $f$ equals 0–6; and wherein $f+d$ equals at least one, with a catalyst comprising
  (1) the product of the reaction, accomplished at temperatures between about 0° C. and about 300° C., for a minimum period ranging from about 10 hours to about 15 minutes, the higher the temperature used, the shorter being the minimum time required, of (a) a compound conforming to the formula:

$$TO_aX_b$$

where T is chosen from the group consisting of metals of Groups IVa, Va, VIa, VIIa and period 4 Group VIII (Mendeleev Periodic System); O is oxygen; $a$ is 0, 1 or 2; each X is any halogen; and $b$ is 1, 2, 3, 4, 5, 6 or 7; and (b) hydroxyl groups in the surface of a particulate finely divided inorganic solid having an average particle diameter of less than about 0.1 micron and having at least $1 \times 10^{-4}$ equivalents per gram of hydroxyl groups chemically bound to the surface thereof; and (2) an organometallic compound chosen from the group consisting of compounds conforming to the empirical formula $$MM'_vX_nR_y$$

wherein M is chosen from the group consisting of the metals of Groups I, II and III; M' is a metal of Group I: $v$ is 0 or 1; each X is any halogen; $n$ is 0, 1, 2 or 3; each R is chosen from the group consisting of any monovalent hydrocarbon and hydrogen; and $y$ is 1, 2, 3 or 4; and $$R'_pH_mSiO_{\frac{4-(m+p)}{2}}$$

wherein R' is chosen from the group consisting of hydrocarbon radicals, aryloxy radicals, alkoxy radicals and the halogens; $p$ is 0, 1, 2 or 3; each H is a hydride radical; $m$ is 1, 2, 3 or 4; Si is silicon; and O is oxygen.

20. The process of claim 19 wherein the reaction between the compound conforming to the formula $$TO_aX_b$$

and hydroxyl groups in the surface of a particulate finely divided inorganic solid is accomplished at temperatures between about 25° C. and about 105° C. for a minimum period ranging from about 1 hour at about 25° C. to about 15 minutes at about 105° C.

References Cited by the Examiner

UNITED STATES PATENTS

| 3,166,541 | 1/1965 | Orzechowski et al. | 260—93.7 |
| 3,166,542 | 1/1965 | Orzechowski et al. | 260—93.7 |
| 3,166,543 | 1/1965 | Orzechowski et al. | 260—93.7 |

FOREIGN PATENTS 823,024  11/1959  Great Britain.

OTHER REFERENCES

Gaylord et al.: Linear and Stereoregular Addition Polymers, p. 106, Interscience, N.Y. (1959).

JOSEPH L. SCHOFER, *Primary Examiner.*

J. F. McNALLY, FRED L. DENSON,
*Assistant Examiners.*